Patented Sept. 16, 1952

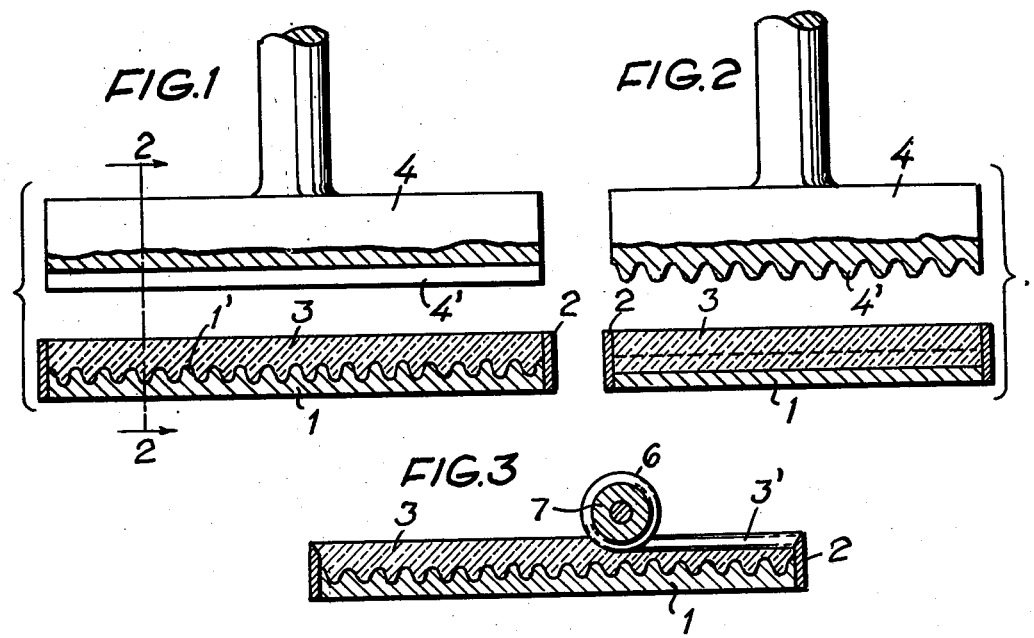
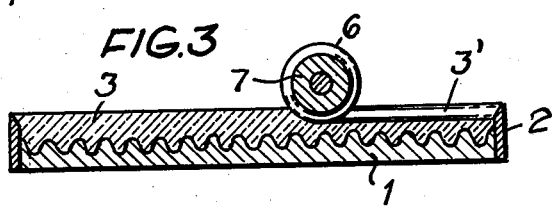
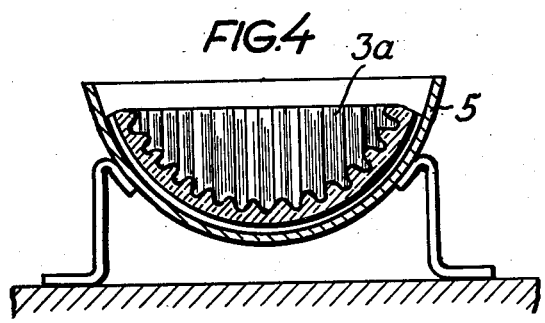
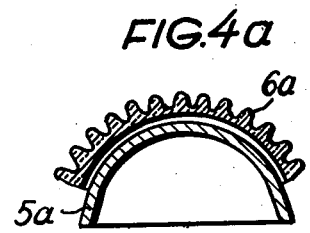
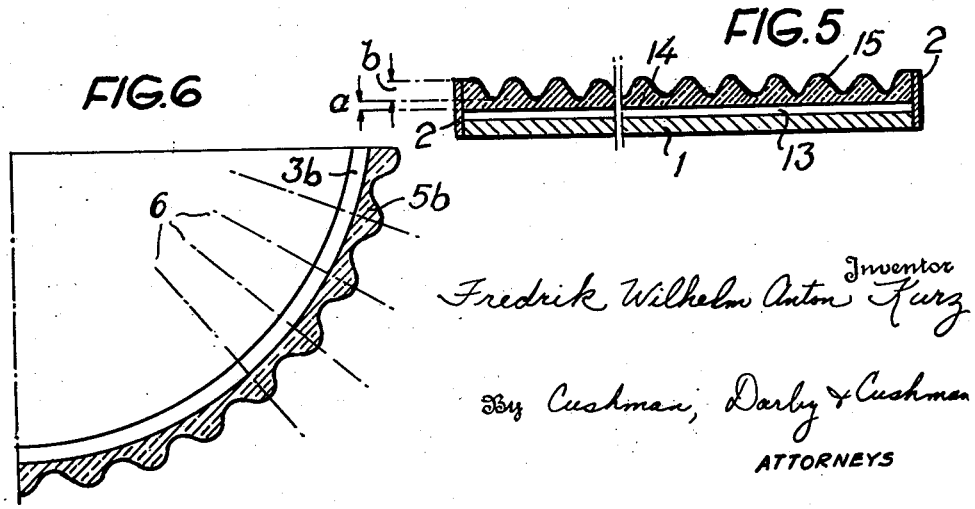

2,610,444

UNITED STATES PATENT OFFICE 2,610,444

METHOD OF PRODUCING ARTICLES OF GLASS

Fredrik Wilhelm Anton Kurz, Nybro, Sweden

Application July 7, 1949, Serial No. 103,489
In Sweden February 2, 1942

Section 1, Public Law 690, August 8, 1946
Patent expires February 2, 1962

11 Claims. (Cl. 49—79)

Various methods, such as opalizing and frosting, are known for reducing the transparency of glass. There are also known various methods for increasing the refractive power of glass. As a rule, reducing of the transparency and increasing of the refractive power counteract each other, since glass which transmits diffused light generally appears rough or milk-coloured, whereas glass with sparkling light refraction, such as faceted glass, is very transparent, so that objects behind the glass can be easily discerned, although in a disfigured shape.

The present invention is a continuation-in-part of my copending application, Serial No. 518,101, filed January 13, 1944, which has been formally abandoned and has for its object to render possible the production of articles of glass, particularly for lighting fixtures, with retained character of clear glass and having an increased refractive power, the transparency being, however, reduced to such an extent that objects behind the glass cannot be discerned, since the rays of light are distributed in different directions. Such articles of glass are especially well adapted for shades for lighting fixtures, as the articles may be given an attractive appearance and the material may be treated to produce good artistic effects.

The method according to the invention may be carried out in various manners, for instance in that the glass is poured or rolled in such a manner in a heated state in a mould being open at the top and having confining edges at the circumference, that the glass at the circumference of the mould is given a contour which is maintained in the final product without mechanical treatment, and in that the glass on its upper side is formed, by pressing or rolling, into projecting portions, such as corrugated designs.

The production of the article of glass may be carried out by pouring or rolling heated viscous glass upon a smooth or fancy mould bottom consisting of iron or any other suitable material. The mould bottom is laterally confined by an edge of iron or other suitable material, which may be detachable and has the shape and design desired for the article to be produced. The edge preferably has the same height as the thickness of the glass to be produced. The glass is spread or rolled toward the edge so as to give the contour of the article the shape of the edge of the mould. Then, the desired design is formed in the glass by means of a suitable tool, such as a pressing tool. Thereby, a glass product profiled on one or both sides is obtained, depending upon whether a smooth or fancy mould bottom is employed. Particularly good effects with effective refraction and greatly reduced transparency are obtained if the projecting portions or grooves or corrugations have another general direction on the upper side of the glass than on the lower one.

In order to produce cup-shaped articles, a substantially round first mould is employed, the ring-shaped lateral edge being either substantially circular or corrugated. In order to produce the cup-shape, the glass treated in the first mould is heated in a furnace and placed upon the second mould having the desired shape. In this case, the glass may sink into the mould or pressed down into the mould by means of a suitable tool without deterioration of the designs previously formed on the surfaces of the glass.

In casting or pressing the glass in a mould, fins or thin edges are likely to be formed especially at the edges of the mould. Such fins can be eliminated by suitable heat treatment of the glass whereby to melt the fins into the mass of the glass. In this way, the fins are removed without any mechanical treatment which might result in disturbing refractive effects.

The method of producing glass articles in accordance with the present invention consists in first forming the glass body in a substantially plane mould having confining edges. In this mould the glass is given designs on the lower side and by a certain operation also on the upper side. The design on the upper side has another general direction than the design on the lower side. The glass is then removed from the mould while still hot and is placed in a furnace in order to be reheated. The glass body removed from the mould must not cool below 350° C., preferably not below about 500° C. before it is placed in the furnace, and in this furnace it is heated so that the upper side of the glass reaches a temperature of about 1000° C. The reheated glass is then removed from the furnace and is bent by means of the second mould. During the reheating, the fins or thin edges formed at the sides of the glass when treated in the first mould are melted into the mass of the glass. At the same time all unevenness of the glass surface is smoothed out, due to the high temperature prevailing in the furnace, so that the glass surface becomes even and shiny.

It is preferable to avoid sharp edges on the glass. The designs on the upper and lower face of the glass should, therefore, be well rounded.

Referring to the drawings in which are shown several preferred embodiments for carrying out the method of treating glass bodies in accordance with the invention:

Figure 1 is a side view, with parts in section, of a mould and a pressing tool for forming the glass in the first step of manufacture.

Figure 2 shows a section along the line 2—2 in Figure 1.

Figure 3 illustrates the same mould as Figure 1 in combination with a roller for producing the design on the upper side of the glass.

Figure 4 illustrates a sectional view of a second mould for producing the final curved shape of the glass.

Figure 4a is a modification of the mould shown in Figure 4.

Figure 5 is a detailed sectional view of a mould showing the glass body provided with corrugated designs on opposite surfaces thereof and extending in different directions, and Figure 6 is a detail sectional view showing a glass body, such as a shade or the like, constructed in accordance with the invention and having the surface thereof subjected to the highest temperature in the furnace turned outwardly in the finished glass body, so that the surface having the brightest lustre will be exposed.

In the drawing, 1 designates the bottom of a mould which is surrounded by an edge member 2 of iron or other suitable material. The upper surface of the bottom of the mould has a suitable design which may be in the form of rounded corrugations 1′, the longitudinal direction of which are at right angles to the direction of the plane of the paper in Figure 1. 3 is a glass body formed from a shapeless mass and which is moulded or pressed down in a plastic state into the form and by means of a suitable tool is made even with the upper side of the edge member 2. 4 is a pressing tool, presenting a design in the shape of corrugations 4′. The corrugations 4′ in the pressing tool have different directions than the corrugations 1′ in the bottom of the mould. The tool 4 is pressed down into the glass mass 3 so that the same on the upper side receives a design corresponding to the shape of the design 4′ of the tool. The glass body thus pressed has now a uniplanar shape.

In order to give the glass body the desired cup form or shade shape, the glass is reheated in a furnace so as to become mouldable and then is removed and may be placed in a second concaved shaped mould 5, Figure 4, having the desired cup form. In the mould 5 the plastic glass may be pressed down into the mould by means of a suitable tool without affecting the general shape of the designs. The glass body 3a then assumes the final shape shown in Figure 4. This final shape is such that the corrugations could not be produced by moulding or pressing since the mould or the pressing tool could not "drop" the glass body. The glass body manufactured according to the present invention is free from marks or irregularities as would arise from a divided mould or a divided pressing tool.

Figure 3 shows the same mould 1 and the enclosing edge member 2 as in Figure 1, and has the corrugated designs 3′ formed in the upper side of the glass body by means of a roller 7 that is provided with annular rounded recesses 6. It will be seen that as the roller 7 moves over the glass 3 and it is subjected to downward pressure, that the corrugations 3′ will be formed in the upper surface of the glass body so as to extend in a direction opposite to the corrugated designs in the bottom surface of the body. In the modification shown in Figure 4a, the mould 5a is of concave shape so that the corrugated designs 6a will be of the same configuration. Thus, it will be seen that a glass fixture provided with ornamental designs on opposite sides thereof may be of any concave or convex shape so as to reduce the transparency of the glass body.

Manifestly, a large number of images of the source of light may be produced for the purpose of giving to the glass article a beautiful and attractive appearance when associated with a lighting fixture or the like. This desired effect may be obtained by providing a number of prismatic or lens-shaped elements which are stamped into the surface of the glass article to form the particular design, and so arranged that the whole assembly will sparkle and produce a multitude of bright spots of a highly aesthetic and pleasing effect.

The optical results produced by the improved method of illuminating lighting fixtures in which means are provided for hiding the source of light and yielding an attractive appearance by the lustre or brilliance imparted to the glass body, may best be obtained by letting the interior and exterior walls of the light fixtures form an assembly of strongly curved surfaces. The curvature of each fixture is such that a number of images of the source of light is produced adjacent to the light fixture or inside the same and are visible from outside the fixture. The size of these images should be such as not to make them appear as being derived from a source of light. It may be added that their mutual distance should be calculated in such a manner that they appear as bright points or spots in the glass article or fixture.

When producing a glass body according to the invention, a mould open at the top may be used for the primary formation (Figure 5) the bottom 1 of the mould being substantially plane and its lateral edge members 2 that extend around the bottom may be detachable. The height of the lateral edge members 2 will preferably substantially correspond to the thickness of the glass body. The bottom of the mould 1 may have a suitable design 13 in the top surface thereof, and the viscous glass heated to a suitable plastic condition is placed in the mould so that the portion of the glass bearing on the bottom of the mould will form a design corresponding to the configuration of the design 13, such as a cross, corrugated projections, protuberances or the like. The design or pattern is formed so that the glass body can be removed in a single piece from the mould and in certain cases, the side edges 2 may be divided in order that the glass body can be removed laterally from the mould.

While the plastic glass body 14 is in the mould, a suitable design 15 may be pressed or formed on the upper surface of the glass in any suitable manner such as by rollers or a stamping operation. The design 15 has a considerable height in the embodiment shown in Figure 5, and preferably is formed with rounded corrugations having a main direction different from that of the design or pattern 13 in the bottom of the body. After the designs are formed on opposite sides of the glass body, the latter is removed from the mould 1 and introduced into a heating furnace before it has an opportunity to cool down below 350° C. and preferably not below 500° C. In this furnace the glass is placed on a suitable bedding such as a portable plate of sheet iron and reheated. During this reheating, the upper or exposed surface of the glass is subjected to a higher temperature than the lower side resting on the bedding, with the result that any imperfections, such as fins formed in the exposed surface of the glass during the initial formation thereof in the mould 1 are melted into the body of the glass so as to provide a glossy, brilliantly exposed outer surface. The reheated glass body is then while still resting on said portable iron plate or support, removed from the furnace when the upper glossy surface of the glass has attained a temperature of at least 900° C. and preferably not more than 1000° C. The formed glass body in its plastic heated condition is then transferred from said plate onto a curved mould or templet and may be positioned in the mould by a suitable tool so as to accurately follow the shape of the mould and without affecting the designs on opposite sides of the glass body. Preferably, the side of the glass body which has been subjected to the highest degree of temperature in the furnace is positioned on the curved mould so that this side will be turned outwardly in the finished glass body, and because of its glossy and brilliant appearance will materially enhance the ornamental characters of the glass body or shade. Since during the reheating operation in the furnace, any irregularities formed in the surface of the glass body flow out into the glass and provide a smooth glossy surface, it will be unnecessary to subject the glass body to any mechanical treatment. When the uniplanar glass body formed in the first mound 1 is taken out from the mould the temperature of the glass has sunk to, say for instance, about 600° C. The temperature of the glass is then too low to permit the uniplanar glass body to be bent by means of the second mould 5. It is for this reason that the glass is reheated to a range between 900° to 1000° C. before being bent to its final form.

In the glass body which has been shown by way of a general example in Figure 5, it is possible to distinguish between three layers, i. e., the layer comprising the design 13 and the layer containing the design 15, and the glass layer of the thickness $a$ lying in between the interior portions of said designs. It has been found that the thickness $a$ should amount to between 4 mm. and 10 mm., preferably between 6 mm. and 10 mm. calculated in true measures. The dimension $a$ has also a certain relation to the dimension of height $b$ for at least the design of one side of the glass. The dimension $b$ should preferably be chosen greater than the dimension $a$, often considerably greater than the latter.

If the design of one side is high or has a great volume or thickness, the design of the other side 13, (Figure 5) may, if desired, be more finely divided and closer, the density being dependent on the height, as a very close design cannot have any considerable height. The close fine design will primarily serve the purpose of dispersing light, and in this way hiding the source of light that illuminates the fixture, while the coarser design, which will usually be turned outwards in the bowl or shade, serves more to give the glass its specific lustre. The design on at least one side of the bowl or fixture is preferably chosen so thick, that the total volume of the design portions amounts to between 50% and 200%, preferably between 75% and 150% of the volume of the glass substance located between the lowest parts of the design on either side thereof.

In Figure 6 there is shown a part of a glass body formed in accordance with the present invention and bent into the shape of a bowl. It should be observed that the glass body 5b and its corrugated designs 3b have such a shape that the fancy portions would not let go from an undivided casting or pressing mould. Hence, such a glass body cannot be made by pressing or casting in an undivided mould. Further, a glossy or shiny surface is imparted to the outer corrugated design by reason of this surface being subjected to the higher heat in the furnace. When shaping the glass to the shape of Figure 6, the corrugations of the design 5b, from the mutual position as shown in Figure 5, have been subjected to a marked mutual displacement. The displacement is in Figure 6, designated by diverging lines 6, which were parallel in the primary mould body.

The shiny even surface which the glass obtains through being reheated in the furnace increases the ornamental effect of the glass proper, so that any mechanical treatment of the final glass product can be dispensed with when the fins are melted into the mass of the glass body. Moreover, the reheating of the glass between the treatment in the first mould and the bending operation is necessary since if the glass were allowed to cool before the intermediate heating takes place, there would be a risk of the glass being broken when forming large ornamental fixtures or designs. In practice, the glass body or shade is made with very strong corrugated designs on at least one side thereof, while the opposite side may be provided with a finer or thin design. By forming the designs on opposite sides of the glass body so as to extend in different directions, a refraction in the glass is obtained which hides or conceals the source of light and also prevents the light from having a blinding effect on the spectator. Due to the reheating of the glass body in the furnace so that one side thereof is heated to a temperature of approximately 1000° C., the entire exposed surface of the glass body is provided with a bright, lustrous, brilliant surface which materially enhances the ornamental and attractive appearance of the fixture. It will be apparent that the edges of the glass body would have an annoying mirror-like effect if they were mechanically worked or formed by grinding. Consequently, the glass body constructed in accordance with the present method is formed with unworked edge portions while the fins which are often formed at the edges of the glass during the initial treatment or heating of the glass in the mould, are melted into the glass by reheating the glass in the furnace to the desired temperatures.

It will be understood that the method for forming the glass articles in accordance with the present invention is merely illustrative and that such changes may be made as fall within the scope of the following claims.

I claim:

1. A method of producing articles of glass which consists in heating a glass body to a plastic state, forming designs on opposite sides of the glass body, the design on one side of the glass body having different general directions than that on the opposite side thereof, reheating the glass body on a portable plate so that one side is heated to a higher temperature than the opposite side and is provided with a glossy finish and to a temperature which causes any fins or thin edges formed on the glass body to be melted into the mass of the glass body, and placing the glass body while carried by the plate and in a plastic state on a curved mould and in such a manner that the plastic glass body assumes the general shape of the curved mould without affecting the general shape of the designs on the glass body.

2. A method of producing articles of glass as called for in claim 1 which consists in reheating the glass body to a temperature so that the upper side of the glass body is heated to at least 900° C.

3. A method of producing articles of glass which consists in heating a glass body to a plastic state, forming corrugated designs on opposite sides of the glass body, the designs on one side of the glass body having different general directions than those on the opposite side thereof, reheating the glass body in a furnace while carried on a portable plate and before the temperature of the glass body falls below 350° C. and so that the upper side of the glass body reaches a temperature of at least 900° C. so that any fins or thin edges formed on the glass body when the same is formed in the mould are melted into the mass of the glass body, and then placing the glass body while carried by the plate and in a plastic state on a curved mould and in such a manner that the plastic glass body assumes the configuration of the curved mould without affecting the general shape of the designs thereon.

4. A method of producing articles of glass which consists in heating a glass body to a plastic state, forming designs on opposite sides of the glass body, the design on one side of the glass body having different general directions than that on the opposite side thereof, reheating the glass body while carried by a portable plate and before its temperature falls below 350° C. so that the upper surface thereof is heated to a higher temperature than its lower surface in order to provide a glossy finish to the upper surface of the glass body, and placing the glass body while carried by the plate and in a plastic state on a curved mould and in such a manner that the plastic glass body assumes the general configuration of the curved mould, the upper glossy surface of the glass body being positioned on the curved mould so that the glossy surface forms the outer surface of the glass body.

5. A method of producing articles of glass which consists in heating a glass body to a plastic state, forming designs on opposite sides of the glass body, the design on one side of the glass body having different general directions than that on the opposite side thereof, reheating the glass body while carried by a portable plate and to a temperature between 900° C. and 1000° C. so that the upper surface thereof is heated to a higher temperature than its lower surface in order to provide a glossy finish to the upper surface to the glass body, the reheating of the glass body also causing fins or thin edges formed on the glass body to be melted into the mass of the glass so that the latter is provided with an even surface, and placing the glass body while carried by the plate and in a plastic state on a curved mould and in such a manner that the plastic glass body assumes the general configuration of the curved mould, the upper glossy finish of the glass body being positioned on the curved mould so that the glossy surface forms the outer surface of the glass body.

6. A method of producing articles of glass for lighting fixtures, having reduced transparency and great refractive power, consisting in moulding a plastic mass of glass into a uniplanar glass body having rounded projecting designs on both sides of the glass body, said designs on one side of the glass having different general directions from those on the other side, reheating the glass on a portable plate and to a temperature above 900° C. so that fins formed at the edges of the glass when formed in the mould are melted into the mass of the glass, and placing the glass body while carried by the plate and in a plastic state on a curved shaped mould, whereby to give the glass body its final curved shape departing from said plane shape so that the relative positions of the designs are changed which increases the refractive power of the light but without affecting the general shape of said designs.

7. A method of producing articles of glass for lighting fixtures, having reduced transparency and great refractive power, consisting in heating a mass of glass to render it plastic, forming the heated glass into a substantially uniplanar body by placing the heated glass on an open mould having confining edges at its circumference and a substantially uniplanar bottom provided with designs running in substantially one direction so as to form corresponding designs on the lower face of the glass body, forming designs on the upper face of the glass, said last-named designs having another general direction than said first-named designs, reheating the glass body while supported on a plate and in a furnace before the temperature of the glass body falls below 350° C. to a temperature between 900° C. and 1000° C., and placing the glass body while carried by the plate and in a plastic state on a curved templet to give the glass body a final curved shape departing from said uniplanar shape so that the relative positions of the designs are changed which increases the refractive power of the glass but without affecting the general shape of said designs.

8. A method of producing articles of glass for lighting fixtures, having reduced transparency and great refractive power, consisting in heating a mass of glass to render it plastic, forming the heated glass into a substantially uniplanar body by placing the heated glass on an open mould having confining edges at its circumference and a substantially uniplanar bottom provided with designs running in substantially one direction so as to form corresponding designs on the lower face of the glass body, forming designs on the upper face of the glass body, said last-named designs having another general direction than said first-named designs, heating the glass body while supported on a portable plate and in a furnace, and then placing the glass body while carried by the plate and in a plastic state on a second substantially dish-shaped mould to give the glass body a final curved shape departing from said uniplanar shape so that the relative positions of the designs are changed which increases the refractive power of the light but without affecting the general shape of said designs, the confined edges of the mould imparting a contour to the glass body that is maintained in the finished curved shaped glass body without mechanical treatment.

9. A method of producing a glass article having reduced transparency and good refraction, which consists in heating a mass of glass to render it plastic, forming the heated glass into a substantially uniplanar body by placing the heated glass on an open mould having confining edges at its circumference and a substantially uniplanar bottom provided with designs running in substantially one direction so as to form corresponding designs on the lower face of the glass body, forming corrugated designs on the upper surface of the glass body, the corrugated designs on the upper surface of the glass body extending in a different direction than the designs on the lower surface of said body, removing the glass body from the mould while hot, reheating the glass body while supported on a portable plate and in a furnace to a temperature above 900° C. and before the temperature of the glass body cools below 350° C. so that the upper surface of the glass body is heated to a higher temperature than the bottom surface thereof in order to provide a glossy finish to the top of the glass body, the reheating of the glass body in the furnace causing fins or thin edges formed on the glass body when the latter is formed in the mould to be melted into the mass of the glass body, said reheating also removing any unevenness of the glass surface by reason of the high temperature prevailing in the furnace, and removing the heated glass body from the furnace while carried by the plate and positioning the same on a curved templet so that the plastic glass body will conform in configuration to the shape of the templet, the glass body when placed on the curved templet being positioned thereon so that the glossy surface forms the outer side of the glass body.

10. A method according to claim 6 characterized by the fact that at least part of the design projections are given a height on at least one side of the glass body greater than the thickness of the glass located between the lowest portions of the designs on opposite sides of the glass body.

11. A method according to claim 6 characterized by the fact that the glass body is dimensioned in such a manner that the volume of glass forming the design on one side of the glass body amounts to between 50% and 200% of the volume of the glass substance lying between the lowest portions of the designs on either side thereof.

FREDRIK WILHELM ANTON KURZ.

REFERENCES CITED

The following references are of record in the file of this patent:

UNITED STATES PATENTS

| Number | Name | Date |
| --- | --- | --- |
| 709,796 | Ripley | Sept. 23, 1902 |
| 720,138 | Hartung | Feb. 10, 1903 |
| 1,146,910 | Wiley et al. | July 20, 1915 |
| 1,571,139 | Nolen | Jan. 26, 1926 |
| 1,670,110 | Fraser | May 15, 1928 |
| 2,218,654 | Paddock | Oct. 22, 1940 |
| 2,352,957 | Kell | July 4, 1944 |